United States Patent [19]

Clausen

[11] Patent Number: 5,461,529
[45] Date of Patent: Oct. 24, 1995

[54] VIDEO PLAYER/RECORDER HEAD DRUM CLEANING DEVICE

[75] Inventor: Eivind Clausen, Bellingham, Wash.

[73] Assignee: Allsop, Inc., Bellingham, Wash.

[21] Appl. No.: 177,273

[22] Filed: Jan. 4, 1994

[51] Int. Cl.[6] .................................................... G11B 5/41
[52] U.S. Cl. ............................................................ 360/128
[58] Field of Search ................................... 360/128, 137;
15/DIG. 13, DIG. 12, 210 R

[56] References Cited

U.S. PATENT DOCUMENTS

| | | | |
|---|---|---|---|
| 3,636,276 | 1/1972 | Rose | 179/100.2 |
| 3,702,906 | 11/1972 | Camras | 179/100.2 |
| 3,717,855 | 2/1973 | Van Acker | 340/174.1 |
| 4,149,206 | 4/1979 | Loiselle | 360/128 |
| 4,225,893 | 9/1980 | Loiselle | 360/128 |
| 4,387,411 | 6/1983 | Clausen et al. | 360/128 |
| 4,442,468 | 4/1984 | d'Alayer de Costemore d'Arc | 360/128 |
| 4,454,550 | 6/1984 | Clausen et al. | 360/137 |
| 4,454,551 | 6/1984 | Clausen et al. | 360/137 |
| 4,458,281 | 7/1984 | Kara | 360/128 |
| 4,462,056 | 7/1984 | Kara | 360/128 |
| 4,498,113 | 2/1985 | Clausen et al. | 360/128 |
| 4,580,185 | 4/1986 | Clausen et al. | 360/128 |
| 4,616,283 | 10/1986 | Clausen et al. | 360/128 |
| 4,698,712 | 10/1987 | Fritsch | 360/128 |
| 4,761,700 | 8/1988 | Fritsch | 360/128 |
| 4,941,065 | 7/1990 | Fritsch | 360/128 |
| 4,984,120 | 1/1991 | Satoh et al. | 360/128 |
| 5,170,304 | 12/1992 | Katohno et al. | 360/128 |
| 5,173,827 | 12/1992 | Boshek, Jr. | 360/128 |
| 5,309,307 | 5/1994 | Fritsch et al. | 360/128 |
| 5,341,257 | 8/1994 | Dienbauer | 360/128 |

FOREIGN PATENT DOCUMENTS

| | | | |
|---|---|---|---|
| 0210787 | 2/1987 | European Pat. Off. | 360/128 |
| 58-45621 | 3/1983 | Japan | 360/128 |
| 59-63020 | 4/1984 | Japan . | |
| 3-241512 | 10/1991 | Japan | 360/128 |
| 4-90116 | 3/1992 | Japan | 360/128 |
| 2239731 | 10/1991 | United Kingdom . | |

Primary Examiner—Stuart S. Levy
Assistant Examiner—Jefferson Evans
Attorney, Agent, or Firm—Christensen, O'Connor, Johnson & Kindness

[57] ABSTRACT

An apparatus for cleaning a video cassette player/recorder machine is disclosed. The apparatus is for cleaning a machine that has a recess to receive a tape cassette, a rotating head drum, a plurality of guide members movable between a nonoperating position and an operating position, and a spool-brake deactivator pin. The apparatus of the invention includes a housing, an activation mechanism, and a cleaning element. The housing is adapted to be positioned in the recess of the machine. The activation mechanism is engaged and moved by the spool-brake deactivator pin when the housing is positioned in the recess of the machine. Engagement with the spool-brake deactivator pin causes the activation mechanism to move the cleaning element into contact with the video head drum. The apparatus also includes two spools rotatably coupled within the housing and a cleaning ribbon attached to the spools. The cleaning ribbon is positioned within the housing to be engaged by the guide members of the machine such that it contacts one side of the rotating head drum when the guide members are in an engaged position.

21 Claims, 5 Drawing Sheets

VIDEO PLAYER/RECORDER HEAD DRUM CLEANING DEVICE

FIELD OF THE INVENTION

The present invention relates generally to devices for cleaning the operating components of video player and/or recorder units, and, more particularly to devices to clean the magnetic head units of video player/recorders.

BACKGROUND OF THE INVENTION

Video player/recorder machines have become very popular for entertainment and other uses. Both the number of hours these machines are used and the number of times they are used have greatly increased. With such an increase in use of video machines, a corresponding increase has occurred in the need to clean the machines. In operation, magnetic oxides may shed off of a tape and may adhere to a head of the machine and its transport system, resulting in inconveniences such as turbulence, dropout, irregular color and color fadeout, upward shifting of a tape, pollution of the pinch roller, and other contamination problems. Dust or other foreign matter may also find its way into the tape path. The problem of foreign matter and oxide accumulation is intensified when rental tapes are used in a machine. Rental tapes are typically lower quality tapes and may be dirtier or have more oxides due to their being used over and over again in uncontrolled environments.

Typically the VHS video player/recorder machine includes a video head drum that contains one or more video heads and also possibly audio heads. The head drum either records or plays back the video portion of a playing tape. The machine also contains a stationary audio head that performs the same function for the sound portion of the tape, an erase head, and other components that engage the tape. To avoid the problems discussed above, the surface portions of at least the video and audio heads, and in some instances other components that contact the playing tape, should be cleaned periodically.

Particularly for video cassette player/recorders, this cleaning operation can be rather difficult. In a typical cassette player/recorder, there is a rectangular cassette recess into which the cassette containing the playing tape is placed. The video head drum and the audio head of the machine are positioned within the housing of the player/recorder and are spaced a moderate distance away from the open cassette recess. When the player/recorder is operated, a number of guides that are part of the player/recorder apparatus engage the tape in the cassette case and move the tape outwardly into engagement with the playing/recording heads. The locations of these heads are sufficiently inaccessible so that cleaning the heads by means of some manually operated instrument is at best a clumsy operation and can possibly damage the more delicate components.

Another problem is that the video playing/recording head drum is a delicate component that should be handled with a high degree of care. A typical video head drum is in the shape of a disc having a circumferential operating surface that engages the surface of the playing tape. On the peripheral surface of the video head, there is at least one (and in some instances a plurality) of video heads. The head drum generally has a multitude of grooves extending circumferentially around the perimeter of the operating surface. When these grooves are clean, they help provide an air bearing between the videotape and the head drum to minimize friction. The video head drum is mounted for rotation about a circular path that is slightly angled or canted with respect to the longitudinal axis of the playing tape. In operation, the video head drum rotates at a very high rate, in the order of one to two thousand revolutions per minute, with the heads scanning the tape on each revolution. In bringing any sort of cleaning device into contact with the video head drum, extreme caution should be exercised in avoiding any damage to the operating elements of the video head. Also, with the video head drum rotating at such high speed, the torque of the drive for the video head drum is necessarily small, so that care should be exercised in not creating any substantial amount of frictional resistance against the peripheral surface of the head, since it is possible that such resistance would substantially reduce the rate of rotation and possibly damage some of the operating components. Many machines have an automatic shutoff that is activated when excess frictional resistance is applied to the drum.

Cassette cleaners have been developed that have a cassette housing in which a cleaning ribbon is mounted. In operation, the cassette housing is placed into the playing receptacle of the player/recorder, and the start knob or button is moved to the "on" or "play" position so that guide members of the player/recorder engage the cleaning ribbon and bring it into engagement with at least the drum of the video head and, in some instances, the other operating components that would normally come into contact with the playing tape. The cleaning action is further assisted by applying a cleaning solution to the ribbon.

The cleaning ribbon typically is mounted on spools within the cassette housing so that, after it is moved out of the cassette housing into cleaning engagement with the drum (and possibly other components of the player/recorder), the cleaning ribbon moves along its axial length at substantially the same rate of speed as the magnetic tape in the normal mode of operation of the player/recorder. Due to the high speed of the video head, there is relative movement between the cleaning ribbon and the drum of the playing head.

One of the major problems in providing such cassette cleaners is the sensitivity of the operating components of the various player/recorders, as discussed above. For example, like the cleaning cassettes, the cassettes for magnetic tapes generally have two spools that engage spindles of the player/recorder. During normal operations, the magnetic tape will be unwound from one spool and wound onto the other. If the head drum or possibly the spindles sense a resistance to rotation greater than a certain level, this will generally activate a shutoff mechanism in the player/recorder. The reason for this is that the increased resistance indicates a problem, and the player/recorder shuts off to avoid damage to the magnetic tape. A number of player/recorders also have other shutoff mechanisms. This can be particularly problematic since the air-bearing surface created between a normal playing tape and the drum by the grooves is not provided between the cleaning ribbon and the drum since the cleaning ribbon is air permeable due to its fabric-like construction.

Another problem of such cassette cleaners arises due to the fact that the cleaning tape is of similar width to a magnetic videotape. The cleaning tape cleans only the area of the components that normally come into contact with a magnetic videotape. Thus, any dirt deposits outside these areas are not removed. This may be a significant problem since most dirt deposits build up on the components on either side of the tape path. These deposits eventually enter the path of the tape, thus reducing the picture and sound quality and causing dirt to be transferred to other components. Ribbon cleaners also have limited capabilities when used with head drums that have grooves formed in their outer periphery. The ribbon does not clean within the grooves and they become collection areas for dirt.

An attempt to deal with the problems of dirt buildup at the edges of the normal tape path and cleaning of drum grooves is disclosed in U.S. Pat. No. 4,761,700 (Fritsch). The Fritsch patent includes a cleaning ribbon and a brush that is activated by movement of the ribbon. The cleaning ribbon encounters frictional contact with the pinch roller and capstan, the audio recording head, a number of guide members, one side of the drum, a brush activation mechanism, the other side of the drum, and the erase head. The brush contacts the drum between the two cleaning ribbon drum contact areas.

Because the brush of the Fritsch device is operatively connected to the cleaning ribbon, the brush cannot operate without the ribbon. Also, the extensive path of the ribbon, including its use to activate the brush and hold it in place while cleaning, introduces extensive frictional resistance on the spindles of the player/recorder. This resistance may cause the player/recorder to shut off, the cleaning benefits thus not being realized. The double contact of the ribbon on the drum combined with the brush contact may also cause excessive resistance on the drum, particularly if a cleaning solution is used on the brush and/or cleaning ribbon.

Because of the above-discussed limitations of the known cassette-cleaning devices, there is a need for a cleaning device that effectively cleans the components of player/recorder machines, that is compatible with most machines, and that does not introduce excessive frictional resistance on either the drum or the spindles of the machine.

SUMMARY OF THE INVENTION

The present invention includes an apparatus for cleaning a video cassette player/recorder machine. The machine to be cleaned includes a structure defining a recess to receive a tape cassette, a rotating head drum, and guide members that move between a nonoperating position and an operating position. The machine also includes a spool-brake deactivator pin, which is positioned to project into a recess in the rear portion of a video cassette to release the spools of the cassette. The cleaning cassette of the invention includes a housing, a cleaning element, and a cleaning element activation mechanism. The housing is shaped like a standard cassette so as to be positioned in the recess of the machine. The cleaning element is coupled to the housing and is movable between a retracted, nonengaged position and an extended cleaning position. The retracted position is within the housing, and the extended position places the cleaning element in contact with the head drum of the machine. The cleaning element activation mechanism is coupled to the housing to secure the cleaning element opposite the head drum of the machine when the housing is placed in the recess. The activation mechanism is arranged and configured to come into contact with the spool-brake deactivator pin when the housing is placed in the recess. Engagement with the spool-brake deactivator pin causes the activation mechanism to position the cleaning element into contact with the head drum for cleaning the head drum.

In the preferred embodiment of the invention, the cleaning element is made of bristles extending generally perpendicular to the side surface of the head drum. In this embodiment, the cleaning element activation mechanism includes a brush holder arm holding the bristles in its forward end. The bristles extend outwardly and slightly upwardly from the forward end of the brush holder arm such that they contact not only the portion of the head drum directly opposite the brush holder arm, but also a portion of the head drum above the end of the brush holder arm.

Alternatively, the cleaning element includes a roller rotatably coupled to the cleaning element activation mechanism. The roller has an axis of rotation generally parallel to the axis of rotation of the head drum of the machine. The roller is preferably made of a cylindrically shaped open-cell foam material.

The preferred embodiment of the invention further includes two spools rotatably coupled within the housing. A cleaning ribbon is attached to the spools and positioned within the housing to be engaged by the guide members of the machine in a manner similar to how the guide members typically engage a cassette tape to be played. The cleaning ribbon contacts one side of the rotating head drum when the guide members are in an engaged position. In the preferred embodiment of the invention, the cleaning ribbon contacts less than 90 degrees of the outer circumferential surface of the head drum. The cleaning ribbon functions and moves independently of the cleaning element and the cleaning element activation mechanism. Such independent operation reduces the friction on the cleaning ribbon.

The preferred construction of the cleaning element activation mechanism includes an activator lever and a holder arm. The activator lever is pivotally attached within the housing. A first end of the activator lever has a pin contact plate arranged and configured to contact the spool-brake deactivator pin when the housing is positioned in the recess of the machine. Contact with the spool-brake deactivator pin causes pivotal movement of the activator lever.

The holder arm secures and positions the cleaning element. The holder arm is pivotally attached to the housing at one end and holds the cleaning element at the other end. Near the attachment to the housing, between that attachment and the cleaning element, the holder arm is pivotally attached to the activator lever. Thus, slight movement of the activator lever caused by its contact with the spool-brake deactivator pin causes the holder arm to extend the cleaning element into contact with the head drum of the machine. The construction specifics of the pin contact plate include an angled portion for sliding contact with the spool-brake deactivator pin as the pin causes pivotal movement of the activator lever. The contact plate is biased toward the spool-brake deactivator pin by a torsion spring such that, when the housing is removed from the recess of the machine, the holder arm retracts the cleaning element into the housing.

The advantages of the present invention are numerous. The activation mechanism for the cleaning element provides many of the significant advantages. Since the cleaning element is activated by the spool-brake deactivator pin, a common element of VHS player/recorders, the cleaning element moves independently from the cleaning ribbon. Thus, the cleaning element may be used in a cleaning device with or without a cleaning ribbon. The use of the spool-brake deactivator pin to activate the cleaning element makes the cleaner usable in all VHS player/recorders since the spool-brake deactivator pin is universally used. Also, because the brush (or other cleaning element) and the cleaning ribbon operate independently, no friction is added to the spindles by operation of the brush.

The use of a brush or a rotationally attached foam cylinder keep friction on the head drum to a minimum while allowing flexible and soft contact with the delicate drum. The delicate components are further protected by the flexible nature of the holder arm that allows backward movement of the cleaning element. Friction is also reduced by the cleaning ribbon's contacting the drum along only a short span on one side of the periphery of the drum.

An additional advantage to having a brush or roller mounted on the holder arm is that a wider portion of the drum can be cleaned than with a ribbon alone. The special angled arrangement of the brush bristles extends the reach of the brush even farther. If grooves are disposed along the drum surface, they are also well cleaned with the brush and its individual bristles.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As indicated previously, the present invention is particularly adapted to clean the operating components of a video recording/playing unit that accepts cassette-type playing tapes. Accordingly, it is believed that a clearer understanding of the present invention will be obtained by first describing the operating components of a conventional video playing/recording unit 10. In the following description, the video playing/recording unit 10 will be referred to as the "video unit" or simply as the "machine".

Figure 1:
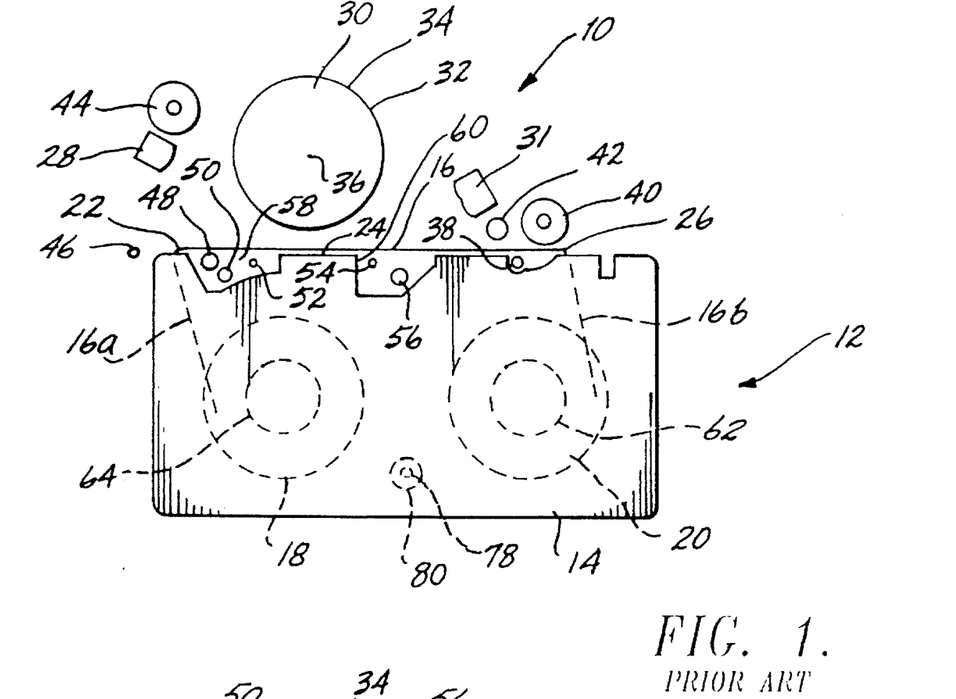
FIG. 1 is a semischematic plan view showing certain operating components of a typical playing/recording apparatus, with a tape cassette mounted in its playing position relative to the apparatus.
Figure 2:
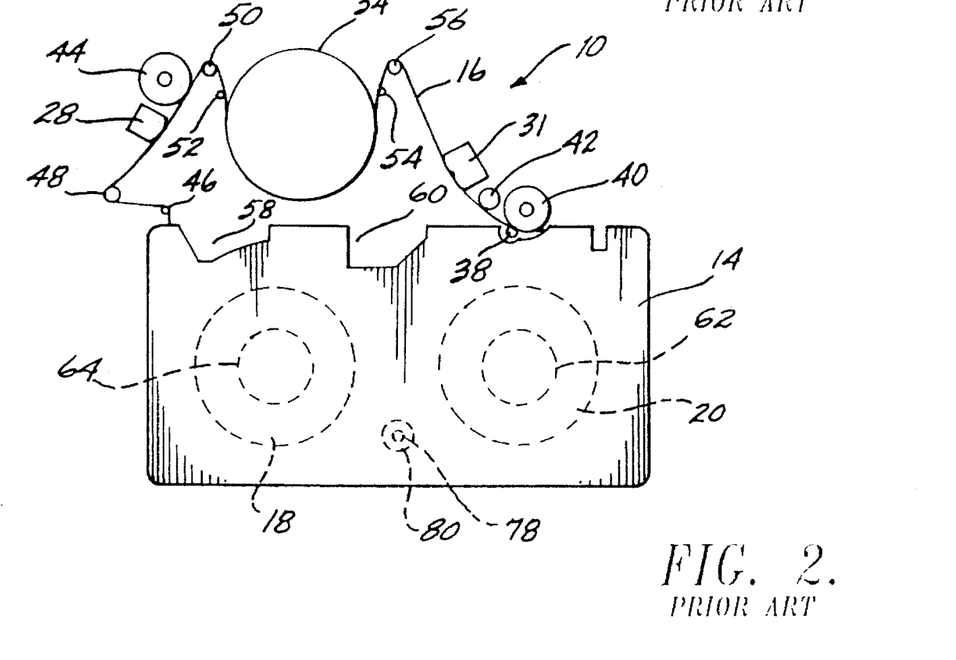
FIG. 2 is a view similar to FIG. 1 showing the tape of the cassette in its playing or recording position.

In FIGS. 1 and 2, some of the main operating components of video unit 10 are shown in plan view, with a tape cassette 12 also being shown in plan view in its operating position in the video unit. In the illustrations of FIGS. 1 and 2, the housing, circuit component, operating knobs, and certain other components of video unit 10 are not shown, since these are not required for an understanding of the present invention. Rather, there are shown only those operating components that directly engage the playing tape or that actuate the shutoff and reversing mechanism of the machine 10.

Tape cassette 12 comprises a case or housing 14, and a magnetic tape 16. Case 14 has a generally rectangular configuration and fits in a matching rectangular recess in video unit 10. (For convenience of illustration the recess for case 14 is not shown.) Tape 16 is wound on left and right spools 18 and 20, the tape extending from one spool 18 to a location 22 at the front left corner of case 14, thence along the front edge 24 of case 14 to a fight front location 26, and thence back to the fight spool 20. A spool brake aperture 80 is provided in the bottom of the case 14. As described below, spool brake aperture 80 accommodates a spool-brake deactivator pin 78 of video unit 10 for release of the spool brake (not shown) prior to playing or recording. In FIG. 1, tape 16 is shown in its nonplaying or retracted position, and in FIG. 2 in its operating position.

Referring now to the operating components of video unit 10, three magnetic operating components are provided to either respond to the magnetic signals on tape 16, affect the magnetic signals on tape 16, or do both. These magnetic operating components are an erase head 28, one or more video heads 34, and an audio head 31. As its name implies, erase head 28 can be operated to cause erasure of the magnetic signals on tape 16. Video head 34 can operate either as a playback head or a recording head. Video head 34 is held within the sides of a head drum 30. Head drum 30 has the general configuration of a circular disc (i.e., a shallow cylinder), and has a peripheral cylindrically shaped operating surface 32. One or more video heads 34 operate as scanning elements and are secured within peripheral surface 32, and head drum 30 rotates about a center axis 36 of cylindrical surface 32. Head drum 30 is slanted moderately from the horizontal so that center axis 36 is canted or angled moderately from a line perpendicular to the plane of tape cassette 12. Thus, as the head drum rotates about its axis 36, video head or heads 34 move across tape 16 in a diagonal line relative to the lengthwise axis of tape 16.

Audio head 31 operates on the audio portion of tape 16 to either play back audio signals on tape 16 (in the playing mode) or to record audio signals on tape 16 when the machine is in its recording mode. Also audio head 31 can in some instances perform an erasing function. Audio heads can also be mounted on head drum 30.

Video unit 10 also comprises a number of mechanical components that operate directly on tape 16 to properly position tape 16 in the operating mode and, also, to move tape 16 along its operating path. First, there is a capstan 38 and a pinch roller 40. A first stationary guide roller 42 is positioned approximately midway between capstan 38 and audio head 31, and a second stationary guide roller 44 is positioned adjacent erase head 28.

Finally, six movable guide members designated 46 through 56, respectively, are provided. Guide member 46 is positioned adjacent the left front corner of cassette case 14, and in its operating position moves toward the fight to engage tape 16 as it moves from the left front portion of case 14. The three guide members 48, 50, and 52 are in their nonoperating positions located in a recess 58 at the left front portion of case 14. In the operating position, shown in FIG. 2, guide members 48, 50, and 52 engage the back side of tape 16 and move it outwardly to guide tape 16 on a path across erase head 28, and thence rearwardly along the left portion of head drum 30. The remaining two guide members 54 and 56 are in the nonoperating position (shown in FIG. 1) located in a second recess 60 at the front middle portion of case 14. In the operating position, guide members 54 and 56 move generally forwardly to the position shown in FIG. 2 to cause tape 16 to track approximately 180 degrees around the circumference of head drum 30, and thence across audio head 31 to a location between capstan 38 and pinch roller 40.

A first drive sprocket 62 fits into the center portion of fight spool 20 in a spline fitting so that it is able to drive spool 20. A second takeup sprocket 64 fits through the center of left spool 18 in a spline fit. A spool-brake deactivator pin 78 is also provided between and somewhat behind sprockets 62 and 64. When tape cassette 12 is initially placed in video unit 10, and video unit 10 is in its nonoperating condition, the operating components are in the position shown in FIG. 1, and tape 16 extends in a straight line along the front edge of case 14. When video unit 16 is placed in an operating mode (either the recording mode, playback mode, or erase mode), several things occur nearly simultaneously. First, guide members 48, 50, and 52 engage the left forward portion of tape 16 to move it outwardly between erase head 28 and videotape 16, and guide member 46 moves to the fight to engage tape 16. Second, as indicated previously, guide members 54 and 56 move the middle portion of tape 16 outwardly to a location between head drum 30 and audio head 31. Third, pinch roller 40 moves rearwardly to press the right-hand portion of tape 16 against capstan 38. Fourth, drive sprocket 62 rotates right spool 20 clockwise to cause tape 16 to be wound thereon. At the same time, second sprocket 64 rotates to permit tape 16 to be wound therefrom.

It is to be understood that video player 10 and tape cassette 12, described above, already exist in the prior art. Also, the mode of operation of unit 10 and tape cassette 12, as described above, already exist in the prior art. With the foregoing description providing background information, the present invention will now be described.

Figure 3A:
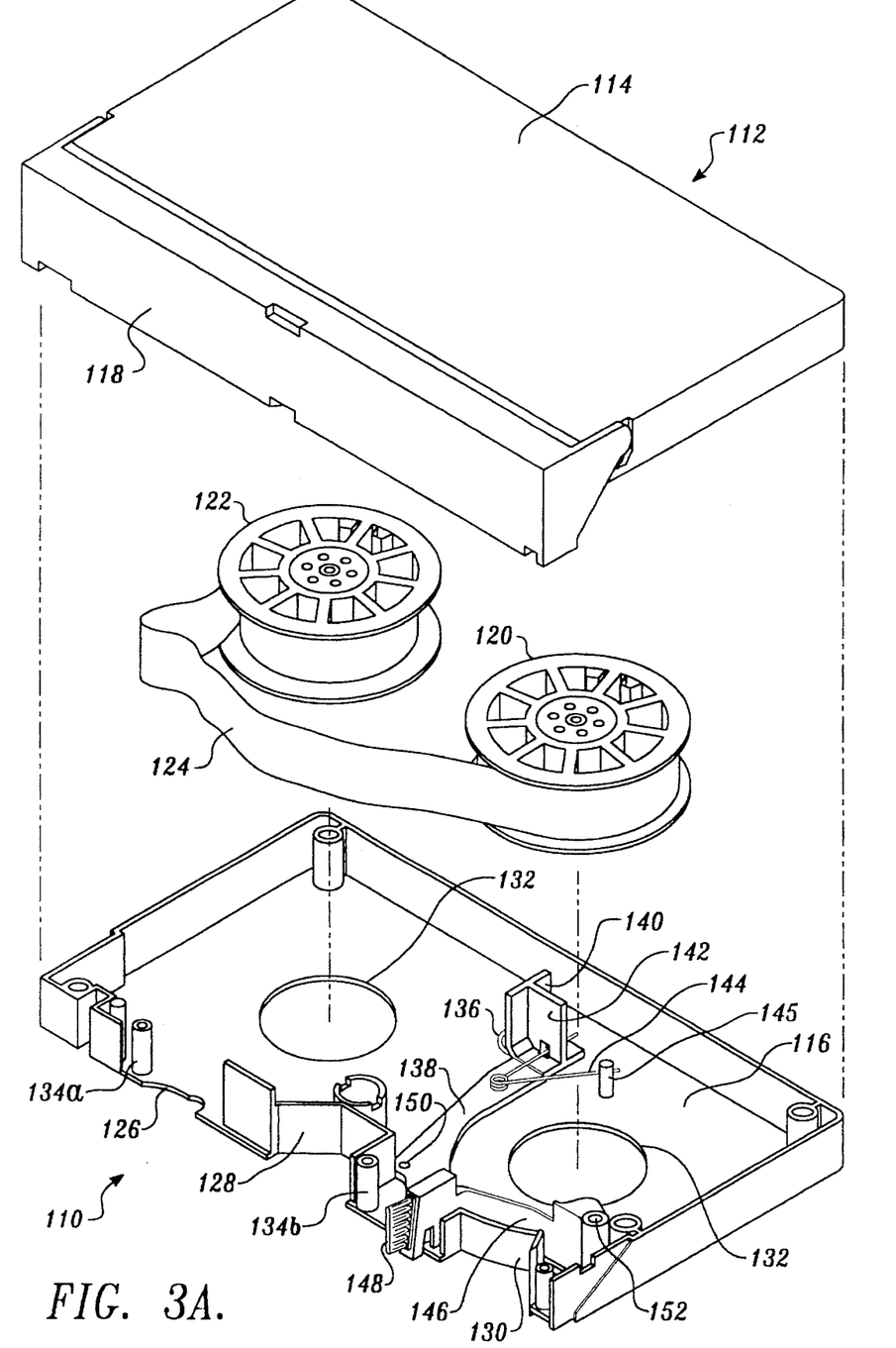
FIG. 3A is an exploded isometric view of the video player/recorder cleaning device of the present invention, illustrating the configuration of the housing in relation to the spools and the activation mechanism.

The cleaning device of the present invention is generally designated 110, and comprises a housing 112 including an upper housing member 114 and a lower housing member 116. FIG. 3A illustrates the cleaning cassette 110 with the upper housing member 114 exploded away from the lower housing member 116. The housing also includes a front cover 118 pivotally attached to the front of upper housing member 114. As seen in FIG. 3A, the overall configuration of housing 112 is substantially the same as a conventional tape cassette, such as that shown at 12 in FIGS. 1 and 2. Thus, cleaning cassette 112 can readily be inserted in the video unit recess that normally accommodates tape cassette 12, as illustrated in FIGS. 1 and 2.

FIG. 3A also illustrates a feed spool 120, a takeup spool 122, and a cleaning ribbon 124, exploded away from housing 112. Spools 120 and 122 are generally short cylindrical members with radially extending flanges that hold cleaning ribbon 124 in alignment wound around the spools. The ends of cleaning ribbon 124 are secured to spools 120 and 122 in a manner similar to the standard attachment of a tape within a cassette. Cleaning ribbon 124 is preferably made of a fabric-type material. A cleaning solution may be added to cleaning ribbon 124 prior to using cleaning cassette 110. A hydrocarbon cleaning solution is preferred. Spools 120 and 122 are positioned within cleaning cassette 110 to be aligned with drive sprockets 62 and 64 of video unit 10.

Other details of housing 112 include a pinch roller and capstan recess 126 in lower housing member 116. Pinch roller and capstan recess 126 allows capstan 38 to project behind cleaning ribbon 124 when cleaning cassette 110 is placed in video unit 10. First and second guide member recesses 128 and 130, respectively, are also formed within the front of lower housing member 116. These recesses are similar to those of a standard cassette tape and allow the guide member to be properly positioned, as explained above. The bottom of lower housing member 116 also includes circular sprocket apertures 132 aligned beneath spools 120 and 122. Sprocket apertures 132 allow drive and takeup sprockets 62 and 64, respectively, to engage spools 120 and 122 such that cleaning ribbon 124 can be advanced or rewound.

Two guideposts 134a and 134b are also secured to housing 112 for guidance and sliding engagement with cleaning ribbon 124. Alternatively, rollers may be used on guideposts 134a and 134b to further reduce friction on cleaning ribbon 124. Guidepost 134a is positioned to the right of pinch roller and capstan recess 126. Guidepost 134b is positioned to the left of first guide member recess 128. Guideposts 134a and 134b are oriented generally perpendicular to the bottom and top surfaces of housing 112 and are slightly wider than cleaning ribbon 124. If rollers are used on guideposts 134, they are preferably constructed of plastic tubes rotatably mounted on guideposts 140 molded integral with housing 112.

Housing 112 also includes a pin aperture 136 located near the rear of lower housing member 116 between sprocket apertures 132. Pin aperture 136 is positioned to accommodate spool-brake deactivator pin 78 of video unit 10. Thus, the size and location of pin aperture 136 is similar to spool brake aperture 80, discussed above.

Figure 3B:
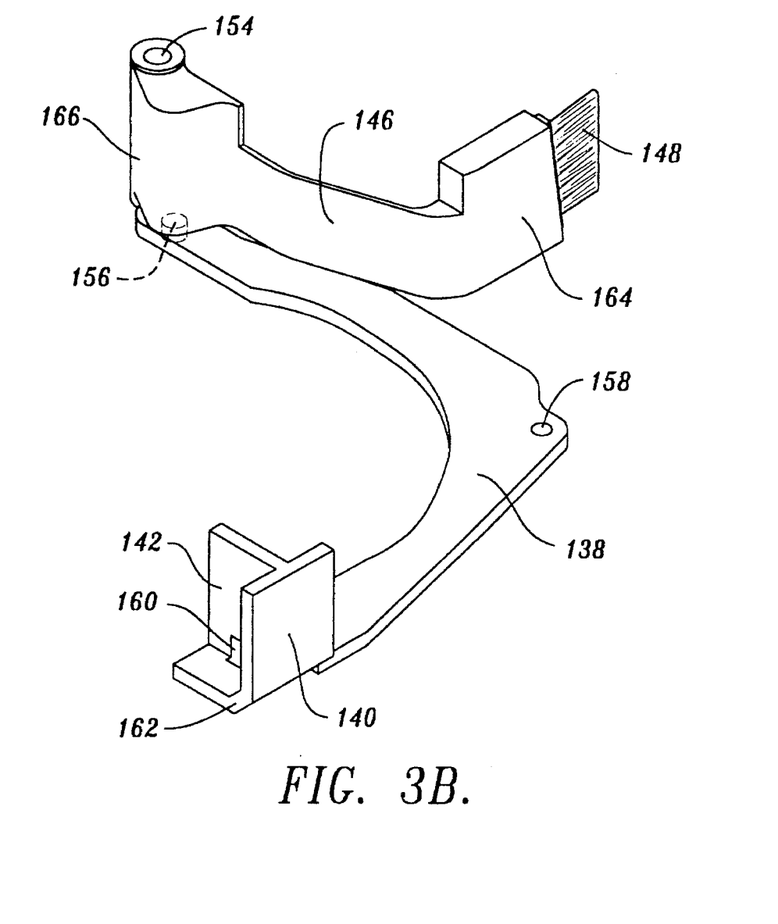
FIG. 3B is an isometric view of the activator lever and holder arm removed from the housing.
Figure 3C:
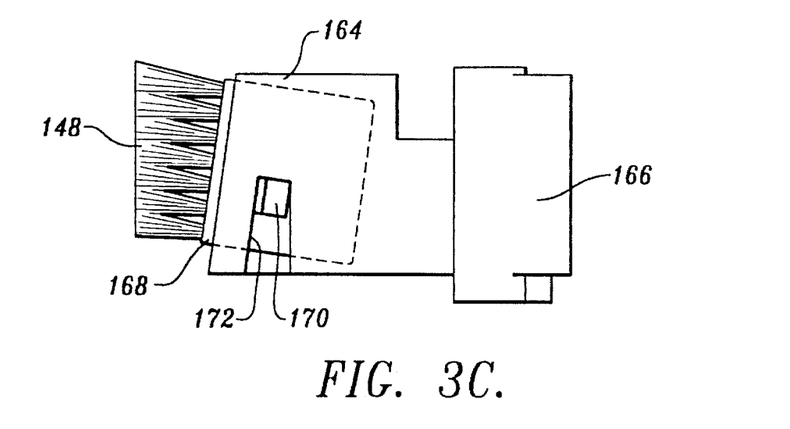
FIG. 3C is a side view of the brush holder arm showing the angled arrangement of the bristles.

An activator lever 138, a holder arm 146, and a brush 148 are also illustrated in FIG. 3A in their positions within housing 112. FIGS. 3B and 3C illustrate activator lever 138 and holder arm 146 with brush 148 attached, viewed in isolation and from different angles for further clarity. Activator lever 138 is generally L shaped and is flat except for a pin contact plate 140 and a plate support 142. Activator lever 138 extends from pin aperture 136, between sprocket apertures 132, and curves around the front of feed spool 120. Activator lever 138 lies flat against the bottom of the lower housing member 116 to allow cleaning ribbon 124 and holder arm 146 to pass over it unobstructed. At the rearward end of activator lever 138, pin contact plate 140 rises from the flat portion. Pin contact plate 140 initially extends upwardly at about 45 degrees to form an angled portion 162, then extends generally vertically upward over pin aperture 136. The face of pin contact plate 140 is generally perpendicular to the major axis of housing 112. Plate support 142 also rises vertically from the flat surface of activator lever 138 and is generally perpendicular to pin contact plate 140.

The positioning of pin contact plate 140 over pin aperture 136, including angled portion 162, provides for contact with spool-brake deactivator pin 78 when cleaner cassette 110 is placed within video unit 10. Plate support 142 includes a spring aperture 160 and a torsion spring 144 provided with one end extending through spring aperture 160. A spring post 145 is integrally molded with lower housing member 116 to provide a stop for spring 144 opposite plate support 142. Thus, spring 144 biases pin contact plate 140 in the direction of pin aperture 136 for engagement with spool-brake deactivator pin 78.

When spool-brake deactivator pin 78 moves pin contact plate 140, activator lever 138 pivots about a lever pivot post 150 located at the corner of activator lever 138 just rearward of first guide member recess 128 and guide roller 134b. Lever pivot post 150 is integrally molded with lower housing member 116. Activator lever 138 includes a lever pivot aperture 158 sized to fit over lever pivot post 150. Transverse movement of pin contact plate 140, caused by spool-brake deactivator pin 78, causes forward movement of the opposite end of activator lever 138 due to the pivotal movement about lever pivot post 150.

The forward end of activator lever 138 is pivotally attached to holder arm 146, such that forward movement of the forward end of activator lever 138 causes a forward end 164 of holder arm 146 to move outwardly. A small movement of activator lever 138 translates to a larger movement of forward end 164 of holder arm 146, due to the location of attachment of the two members. A rearward end 166 of holder arm 146 includes a vertically oriented arm pivot aperture 154. Arm pivot aperture 154 is engaged over an arm pivot post 152, also oriented vertically, near the front left corner of lower housing member 116. Arm pivot post 152 is preferably integrally molded with lower housing member 116. The connection between activator lever 138 and holder arm 146 is accomplished with an arm-to-lever pivot post 156 extending downwardly from rearward end 166 of holder arm 146. Activator lever 138 includes a slot in which arm-to-lever pivot post 156 is engaged.

From its connection to housing 112 and to activator lever 138, holder arm 146 extends, with an L shape, forwardly and to the fight side of second guide member recess 130. Forward end 164 of holder arm 146 is positioned at the front of cleaner cassette 110 so as to be opposite head drum 30 of video unit 10. Forward end 164 secures brash 148. A portion of holder arm 146 between forward end 164 and rearward end 166 is preferably constructed of plastic material of a much thinner section than forward and rearward ends 164 and 166. This portion of holder arm 146 provides flexibility to holder arm 146 to give an added measure of protection against damage to drum 30 or heads 34.

FIG. 3C illustrates the attachment of brush 148 to forward end 164 of holder arm 146. Brush 148 is secured within a brush base 168. The bristles of brush 148 extend generally perpendicular to brush base 168. Brush base 168 is seated at a slight upward angle within forward end 164 of holder arm 146. This arrangement projects the bristles of brush 148 upwardly so that wider contact with cylindrical surface 32 of drum 30 is obtained. The ends of the bristles are cut generally vertically so that they uniformly contact cylindrical surface 32. Brush base 168 could alternatively be oriented without an upward angle, the bristles fanning out to cover a wider area. A base tab 170 projects laterally from brush base 168 to lock within a tab aperture 172 on the side of forward end 164 of holder arm 146.

Figure 4:
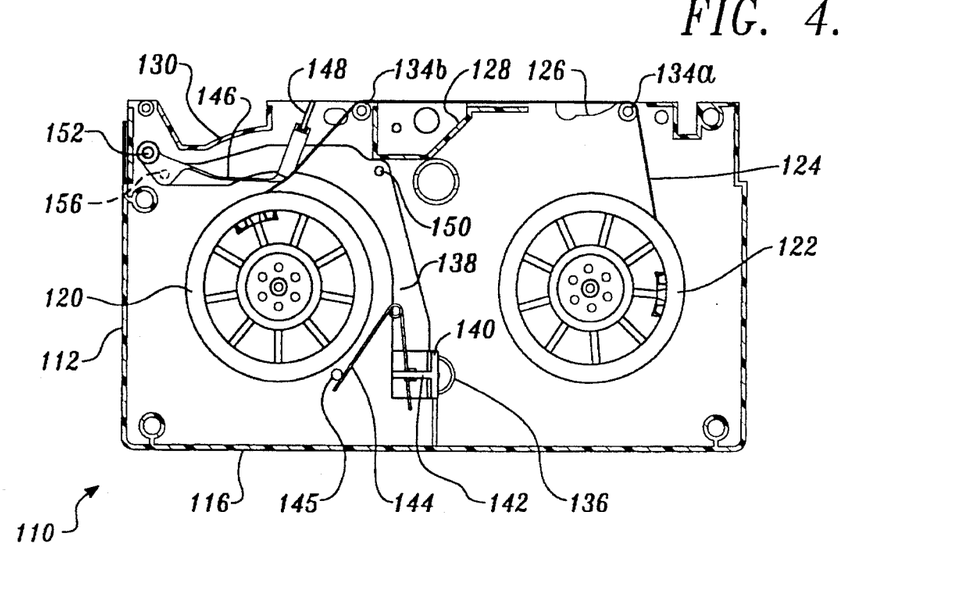
FIG. 4 is a top view of the video player/recorder cleaning device with the top of the housing cut away to expose the elements of the device in a retracted position.

Further details of the operation of cleaning cassette 110 will now be described in conjunction with FIGS. 4 and 5. Before cleaning cassette 110 is inserted into video unit 10, brush 148 is in a retracted position within housing 112. Brush 148 is held in this retracted position by spring 144. Spring 144 pushes pin contact plate 140 over pin aperture 136. Activator lever 138 pivots about lever pivot post 150 such that the forward end of activator lever 138 is in its rearward position. The rearward position of activator lever 138 maintains holder arm 146 in a retracted position with brush 148 within housing 112.

Before being engaged by the components of video unit 10, cleaning ribbon 124 extends from feed spool 120, behind holder arm 146, around the forward side of guidepost 134b, along the front of housing 112 behind front cover 118 (not shown in FIGS. 4 and 5), around guidepost 134a to engagement with takeup spool 122.

Figure 5:
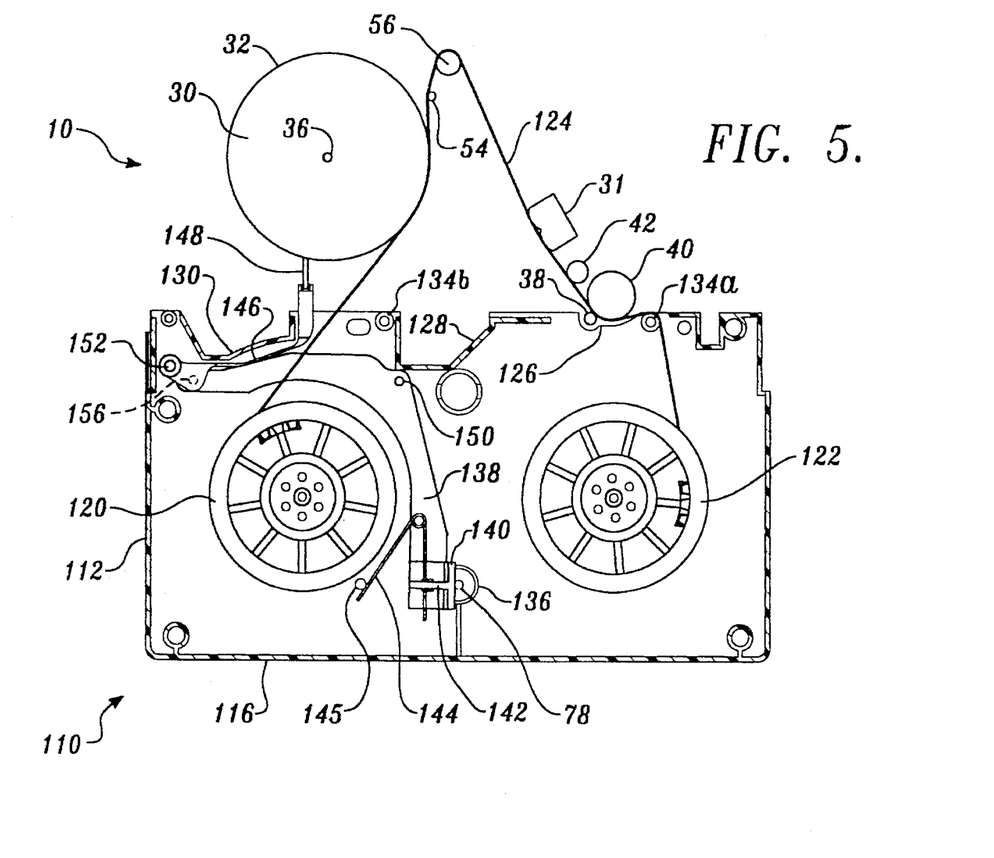
FIG. 5 is a top view of the video player/recorder cleaning device with the top of the housing cut away to expose the elements of the device in an extended position.

Referring now to FIG. 5, after cleaning cassette 110 is placed within video unit 10 and "play" is activated the cleaning mechanisms are engaged with the video unit components. Initially, when cleaning cassette 110 is placed in video unit 10, brush 148 is automatically extended to contact head drum 30. This occurs due to the placement of cleaning cassette 110 over the stationary spool-brake deactivator pin 78 such that pin 78 projects up into pin aperture 136 and contacts pin contact plate 140. Contact with pin contact plate 140 causes activator lever 138 to pivot about lever pivot post 150 and move holder arm 148 forward about arm pivot post 152. Thus, activation of brush 148 is independent of cleaning ribbon 124 and, in fact, occurs before cleaning ribbon 124 is engaged.

Cleaning ribbon 124 is moved into the cleaning position by movable guide members 54 and 56 after "play" is activated. Cleaning ribbon 124 then extends from feed spool 120, around a small portion of the perimeter of cylindrical surface 32, around guide members 54 and 56, along the face of audio head 31 and first stationary guide roller 42, between capstan 38 and pinch roller 40, around guide roller 134a, and finally back to takeup spool 122. The minimal contact with head drum 30 in this preferred embodiment reduces the friction of cleaning ribbon 124 on drum 30. Not only does lower friction result from less contact with head drum 30 but also from no contact with other components of video unit 10 on the left side of head drum 30. Alternatively, cleaning cassette 110 could be modified slightly so that the path of cleaning ribbon 124 extends behind brush holder arm 146 and out to engage the other components of video unit 10 on the left of head drum 30. This minimal contact of cleaning ribbon 124 with drum 30 eliminates the frictional resistance problem on the head that would occur with a greater drum wrap (typically 180 degrees) and with application of a cleaning solution.

With "play" being activated, head drum 30 rotates while in contact with both brush 148 and cleaning ribbon 124, one or both of which may have a cleaning solution on them. Cleaning ribbon 124 also is driven by drive sprocket 62 from feed spool 120 to takeup spool 122. When cleaning ribbon 124 is unwound from feed spool 120 excessive resistance is sensed and video unit 10 retracts cleaning ribbon 124 and either stops or rewinds cleaning ribbon 124 and stops. The combined cleaning action of both brush 148 and cleaning ribbon 124 both loosens and removes dirt, magnetic oxide particles, and other foreign matter. The wide contact of brush 148 cleans beyond the sides of the normal tape path such that buildup at the sides is removed. Also, the bristles extend into the grooves on the head drum.

Excessive resistance on cleaning ribbon 124 or on drum 30 would cause the machine to automatically shut off Such excessive resistance is avoided due to the independent action of brush 148 from cleaning ribbon 124 and due to the limited engagement of cleaning ribbon 124 with head drum 30 and with the other machine components. This is especially critical when a cleaning solution is used, since solutions tend to increase the friction involved.

The independent action of brush 148 provides other advantages as well. For example, brush 148 and its activation mechanism can be used without a cleaning ribbon at all for special cleaning purposes. Also, the activation with spool-brake deactivator pin 78 makes cleaning cassette 110 more universal than other cleaners since the use and location of the spool-brake deactivator pin is so widespread among all VHS video machine manufacturers. Thus, compatibility is assured. Brush 148 and its mechanism are also not subject to feed, alignment, or jamming problems associated with ribbons and guide members. Brush 148 is positively engaged independent of anything but spool-brake deactivator pin 78.

Figure 6A:
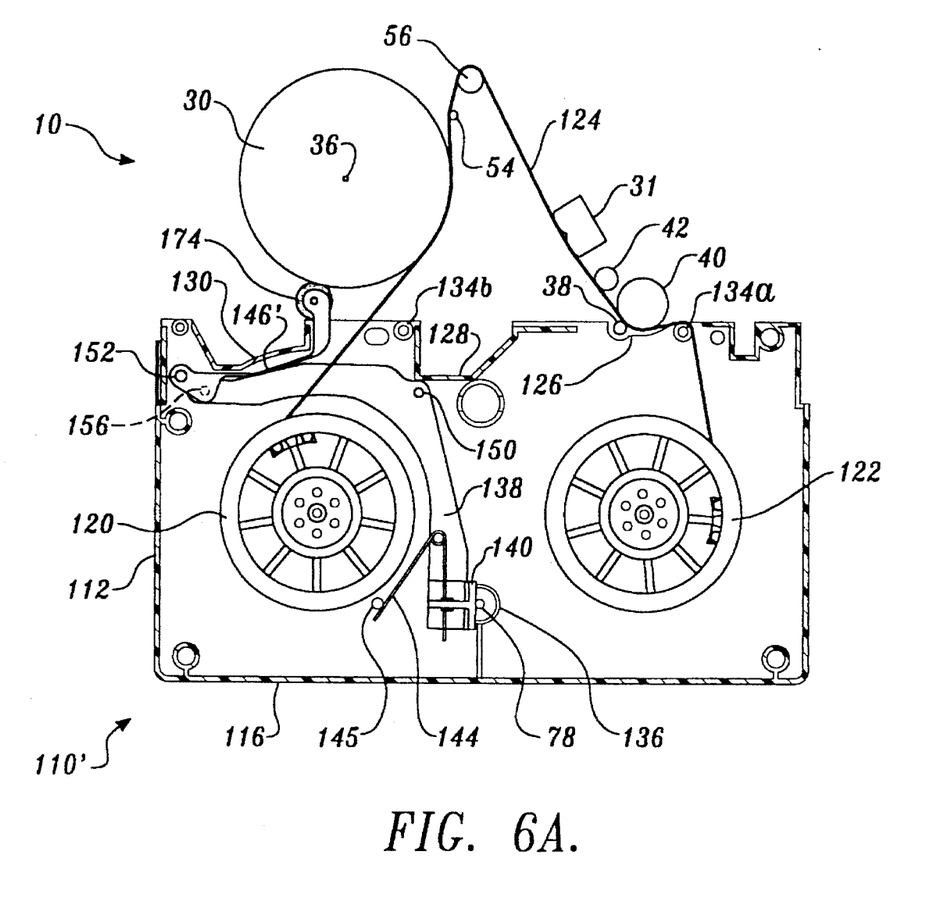
FIG. 6A is a top view of an alternate embodiment of the video player/recorder cleaning device with the top of the housing cut away to expose the elements of the device in an operating position.
Figure 6B:
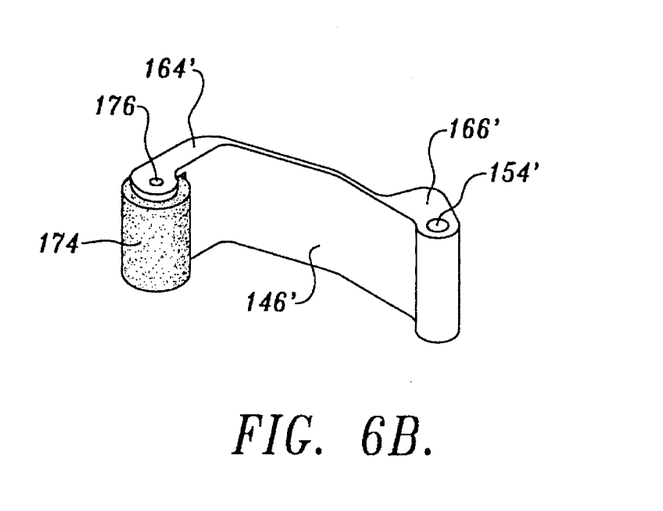
FIG. 6B is an isometric view of the holder arm and roller illustrated in FIG. 6A.

FIGS. 6A and 6B illustrate an alternate embodiment of holder arm 146' that includes a roller 174 instead of brush 148. Roller 174 is rotatably mounted to forward end 164' of holder arm 146'. Roller 174 is preferably a cylindrical foam pad. Alternatively, roller 174 may be made of a stack of foam disks. Forward end 164" includes projections that secure an axle 176 extending through the longitudinal axis of roller 174. The axis of rotation of axle 176 is preferably parallel to center axis 36 of head drum 30. Thus, as drum 30 rotates, roller 174 also rotates to somewhat reduce the friction on head drum 30. Roller 174 is preferably made of an open-cell foam such that a cleaning solution may be applied and held therein. In most other respects the operation of the embodiment shown in FIGS. 6A and 6B is the same as that described above.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An apparatus for cleaning a video cassette player/recorder machine having a structure defining a recess to receive a tape cassette, a rotating head drum, a plurality of guide members movable between a non-operating position and an operating position, and a spool-brake deactivator pin, the apparatus comprising:

(a) a housing adapted to be positioned in the recess of the machine;

(b) a cleaning element movably coupled to said housing, said cleaning element being movable between a retracted position at least substantially within said housing and an extended cleaning position at least partially in contact with the head drum of the player/recorder machine; and (c) cleaning element activation means including a cleaning element holder and an activation lever, said activation means being coupled to said housing, said activation means securing said cleaning element opposite the head drum of the machine when said housing is placed in the recess, said activation lever being arranged and configured to contact the spool-brake deactivator pin when placed in the recess and being directly connected to said cleaning element holder, contact of said activation lever with the spool-brake deactivator pin pivoting said activation lever, and, in turn, moving said cleaning element into contact with said head drum for cleaning said head drum.

2. The apparatus of claim 1, further comprising:

at least two spools rotatably coupled within said housing;

a cleaning ribbon attached to said spools and positioned within said housing to be engaged by at least one of the plurality of guide members of the machine, said cleaning ribbon contacting one side of the rotating head drum when said guide members are in an engaged position.

3. The apparatus of claim 2, wherein said cleaning ribbon is independent of said cleaning element and said cleaning element activation means.

4. The apparatus of claim 3, wherein said cleaning element comprises bristles extending generally perpendicular to the side surface of the head drum.

5. The apparatus of claim 3, wherein said cleaning element comprises bristles and said cleaning element activation means comprise a brush holder arm having a forward end holding said bristles, said bristles extending outwardly and upwardly from the forward end of said brush holder arm to contact a portion of the head drum above the end of the brush holder arm.

6. The apparatus of claim 3, wherein said cleaning element comprises a roller rotatably coupled to said cleaning element activation means, said roller having an axis of rotation generally parallel to the axis of rotation of the head drum of the machine.

7. The apparatus of claim 6, wherein said roller is made of foam.

8. The apparatus of claim 3, wherein the head drum is cylindrical and has an outer circumferential surface and wherein said cleaning ribbon contacts less than 90 degrees of the outer circumferential surface of the head drum.

9. The apparatus of claim 1, wherein said cleaning element comprises a roller rotatably coupled to said cleaning element activation means, said roller having an axis of rotation generally parallel to the axis of rotation of the head drum of the machine.

10. The apparatus of claim 9, wherein said roller is made of foam.

11. The apparatus of claim 1, wherein said cleaning element comprises bristles extending generally perpendicular to the side surface of the head drum.

12. The apparatus of claim 1, wherein said cleaning element comprises bristles and said cleaning element activation means comprise a brush holder arm having a forward end holding said bristles, said bristles extending outwardly and upwardly from the forward end of said brush holder arm to contact a portion of the head drum above the end of the brush holder arm.

13. An apparatus for cleaning a video cassette player/recorder machine having a structure defining a recess to receive a tape cassette, a rotating head drum, a plurality of guide members movable between a nonoperating position and an operating position, and a spool-brake deactivator pin, the apparatus comprising:

(a) a housing adapted to be positioned in the recess of the machine;

(b) an activator lever pivotally attached to said housing and including a first end and a second end, said first end having a pin contact plate arranged and configured to contact the spool-brake deactivator pin when said housing is positioned in the recess of the machine, contact with the spool-brake deactivator pin causing pivotal movement of the activator lever;

(c) a holder arm including an attachment end pivotally attached to said housing and a cleaning element end, said second end of said activator lever being pivotally attached to said brush holder arm between said first and second ends of said brush holder arm; and (d) a cleaning element secured to the cleaning element end of said holder arm opposite the head drum of the machine when the housing is positioned in the recess of the machine.

14. The apparatus of claim 13, further comprising:

two spools rotatably coupled within said housing; and a cleaning ribbon attached to said spools and positioned within said housing to be engaged by at least one of the plurality of guide members of the machine, said cleaning ribbon contacting one side of the rotating head drum when said guide members are in an engaged position.

15. The apparatus of claim 14, wherein said holder arm and said activator lever move independently of said cleaning ribbon and said spools.

16. The apparatus of claim 15, wherein said cleaning element comprises bristles extending generally perpendicular to the side surface of the head drum.

17. The apparatus of claim 15, wherein said cleaning element comprises bristles extending outwardly and upwardly from the cleaning element end of said holder arm to contact a portion of the head drum above the end of the holder arm.

18. The apparatus of claim 15, wherein said cleaning element comprises a roller rotatably coupled to the cleaning element end of said holder arm.

19. The apparatus of claim 15, wherein said pin contact plate includes an angled portion for sliding contact with the spool-brake deactivator pin as the pin pivots said activator lever and wherein said contact plate is biased toward said spool-brake deactivator pin.

20. The apparatus of claim 13, wherein said cleaning element comprises a roller rotatably coupled to the cleaning element end of said holder arm.

21. The apparatus of claim 13, wherein said cleaning element comprises bristles extending outwardly and upwardly from the cleaning element end of said holder arm to contact a portion of the head drum above the end of the holder arm.

* * * * *